United States Patent [19]
Tessler et al.

[11] 3,904,601
[45] Sept. 9, 1975

[54] HYDROXYPROPYLATED, INHIBITED HIGH AMYLOSE RETORT STARCHES

[75] Inventors: Martin M. Tessler, Edison; Wadym Jarowenko, Plainfield, both of N.J.; Richard A. Amitrano, Brooklyn, N.Y.

[73] Assignee: National Starch and Chemical Corporation, Bridgewater, N.J.

[22] Filed: Dec. 21, 1972

[21] Appl. No.: 317,413

[52] U.S. Cl. ... 260/233.3 R; 260/233.3A; 260/233.5; 426/167
[51] Int. Cl. .......................................... C08b 19/06
[58] Field of Search.... 260/233.3 R, 233.5, 233.3 A

[56] References Cited
UNITED STATES PATENTS

| | | |
|---|---|---|
| 3,238,193 | 3/1966 | Tuschhoff et al. ............ 260/233.3 R |
| 3,278,522 | 10/1966 | Goldstein et al. ............. 260/233.3 R |
| 3,369,910 | 2/1968 | Ganz et al. .................... 260/233.3 R |
| 3,422,088 | 1/1969 | Tuschhoff et al. ........... 260/233.3 R |
| 3,719,661 | 3/1973 | Robinson et al. ............. 260/233.3 R |
| 3,804,828 | 4/1974 | Szymanski et al. .......... 260/233.3 R |

*Primary Examiner*—Melvyn I. Marquis

[57] ABSTRACT

An hydroxypropylated, inhibited high amylose starch is disclosed having specified amounts of hydroxypropylation and inhibition which has excellent thin-thick properties for use in food products to be retorted. The disclosed starches give good texture to the food products in which they are used.

3 Claims, 1 Drawing Figure

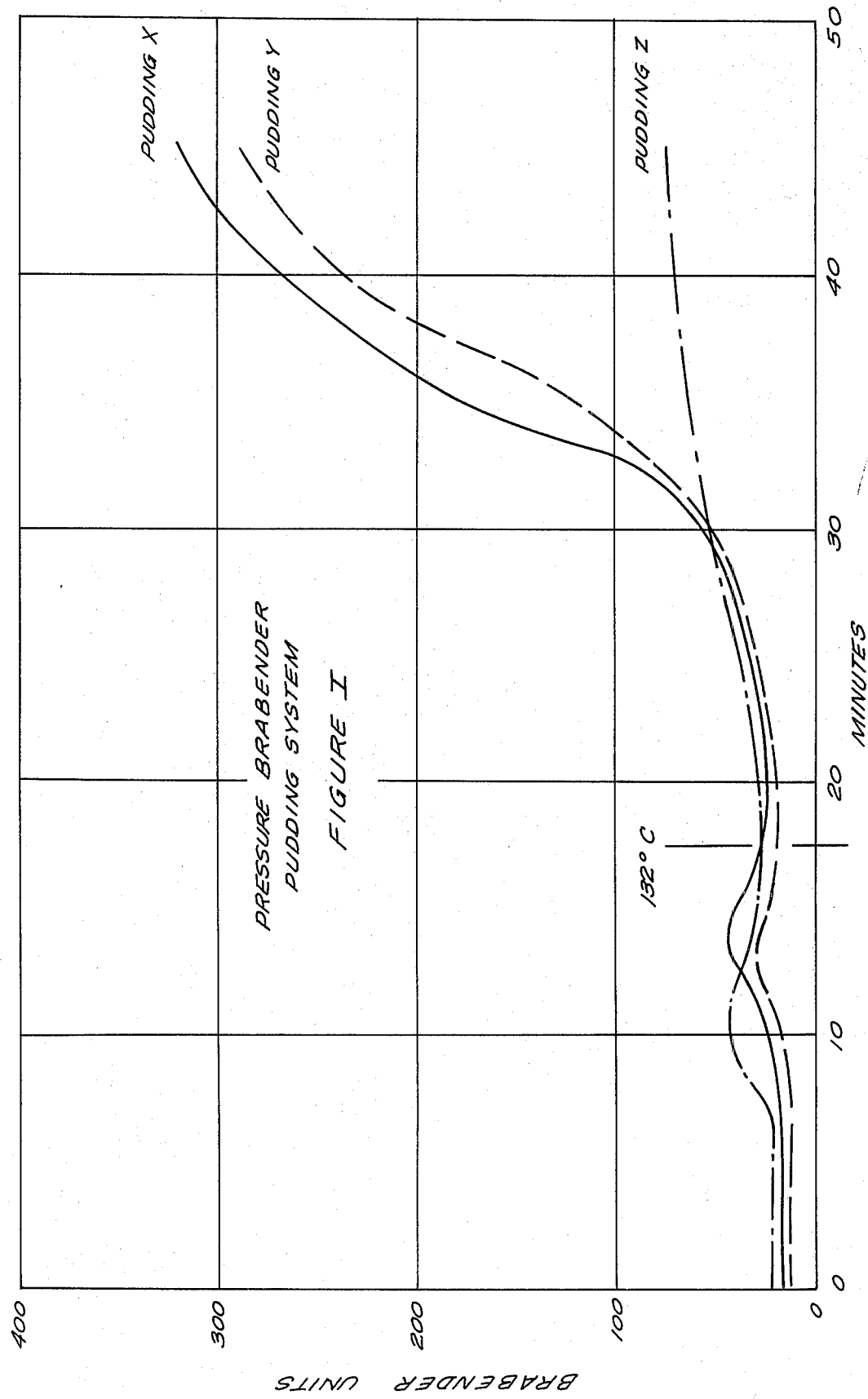

3,904,601

HYDROXYPROPYLATED, INHIBITED HIGH AMYLOSE RETORT STARCHES

BACKGROUND OF THE INVENTION

This invention relates to inhibited, hydroxypropylated high amylose starches and more particularly to such starches which are capable of imparting desirable rapid heat penetration and good texture to food products when the foods are cooked at superatmospheric pressure (retorted).

Starch has long been used as a thickener for many types of foods. In recent years as the use of prepared and processed foods has become more prevalent, a demand has arisen for foods having properties specially adapted to the requirements of industrial processing. In response to this demand, specially modified starches, capable of imparting to use. A particular type of modified starch useful in the food industry is one having "thin-thick" properties. Such a starch does not develop appreciable viscosity when cooked in boiling water at normal atmospheric pressure, but does develop appreciable viscosity after cooking in water a higher temperatures attained by cooking under pressure. Starches having "thin-thick" properties are useful in the canning industry when thickened canned foods are to be prepared. When canned foods containing such a starch as a thickening agent are heated in a bath having a temperature between 240° and 300°F (retorted), the heat can penetrate rapidly into the unthickened contents of the can as the internal temperature of the contents rises above 212°F. The contents of the can are thus rapidly sterilized. Upon cooling, the cooked starch must thicken in order for the food product in final form to possess a desired viscosity and texture. It has now been found that granular starches containing more than 50% amylose can be stabilized by reaction with propylene oxide and inhibited by reaction with cross-linking agents to yield modified starches having outstanding high temperature, short time retort properties. These starch thickeners do not develop significant viscosity when cooked at retort temperatures, do not develop significant viscosity when cooled to about 120°F after retorting, but do develop significant viscosity when cooled to room temperature (75°F) after retorting. These unique properties allow heat to rapidly penetrate the contents of the can during retorting, and also allow the contents of the can to be rapidly cooled after retorting.

SUMMARY OF THE INVENTION

It is an object of this invention to prepare novel modified starches having properties useful in retorted canned foods. A further object is to prepare such starches from granular high amylose starches by treatment with propylene oxide and cross-linking agents.

According to this invention granular high amylose starch, that is starch containing at least 50% amylose, is stabilized by reacting with propylene oxide to produce an hydroxypropyl starch having a M. S. of between 0.10 and 0.30 and inhibited by reaction with a cross-linking agent so that the modified starch yields an aqueous dispersion containing 5.0 per cent starch, by weight, dry basis, having a Brookfield viscosity measured at 75°F between 0 and 1500 centipoises after being cooked at 5.0 per cent, by weight, starch solids concentration, dry basis, in a pH 6.5 buffered salt solution at 180°F for 25 minutes and standing for 24 hours at room temperature, and a Brookfield viscosity measured at 75°F between 1,500 and 10,000 centipoises after being cooked at 5.0 per cent starch solids concentration, dry basis, in a pH 6.5 buffered salt solution at 212°F for 10 minutes, followed by 15 minutes at 250°F and then standing at room temperature for 24 hours. The viscosity after cooking at 250°F must be at least four times the viscosity after cooking at 180°F.

It is intended for purposes herein that a viscosity of 0 centipoises designate a viscosity which is essentially zero or a viscosity that is so low as to be immeasurable by the Brookfield viscometer.

M. S. is defined as the average number of moles of propylene oxide combined with starch per anhydro-D-glucose unit.

DESCRIPTION OF THE PREFERRED EMBODIMENTS

The starch used for the base material for the modified starch of this invention must be a granular high amylose starch, that is it must contain more than 50% amylose. Suitable starches for example, may be obtained from varieties of corn having starch with amylose contents greater than 50 per cent by conventional wet milling processes. Also included are the conversion products derived from high amylose starches, for example oxidized starches prepared by treatment with oxidants such as sodium hypochlorite, and fluidity or thin boiling starches prepared by enzyme conversion or by mild acid hydrolysis. Regular corn starch, which contains about 27% amylose, cannot be used to prepare the novel starch derivatives of this invention.

The granular high amylose starch must be hydroxypropylated to a M. S. of between 0.10 and 0.30. This hydroxy-propylation may be carried out by well known means such as the reaction of starch with propylene oxide in an alkaline aqueous medium. Hydroxypropylation of starch is described in E. J. Hjermstad, "Production and Uses of Hydroxyethylstarch," in R. L. Whistler and E. F. Paschall, Eds., Starch: Chemistry and Technology, Academic Press, New York, 1967, Vol. II, pp. 423–432.

The hydroxypropylated high amylose starch must also be inhibited by cross-linking to a degree which produces the viscosity range described above. Inhibition may be carried out by reacting the starch with any conventional inhibiting reagent. Typical inhibiting reagents useful in preparing the modified starches of this invention are acrolein, epichlorohydrin, phosphorus oxychloride, 1,4-dichlorobutene-2, cyanuric chloride, sodium trimetaphosphate, bis(ethylcarbonic) adipic anhydride, linear polymeric adipic anhydride, bis(ethylcarbonic)fumaric anhydride, succinyl guanidine, adipyl guanidine, phosgene, 1,1'-carbonyldiimidazole, the diimidazolide of succinic acid, the diimidazolid of adipic acid, divinyl adipate, mixtures of adipic acid with acetic anhydride, mixtures of chlorine with glycine, and the like. The inhibition reaction is entirely conventional and is carried out under conditions appropriate for reacting the chosen cross-linking reagent as is well known to those skilled in the art.

The inhibition reaction may, in general, be carried out either before or after the hydroxypropylation reaction. However, in the case of some inhibiting reagents, especially those producing ester cross-linkages, the alkaline conditions used in the hydroxypropylation will disrupt the cross-links. Hence, if this type of cross-link is desired, the hydroxy-propylation must be carried out first.

A preferred inhibiting reagent is epichlorohydrin, which may be reacted with the starch in quantities of about 0.01 per cent, by weight, of the starch under alkaline conditions at about 40°C for a period of about 5 hours, to produce a degree of inhibition suitable for use in food products to be retorted. The resultant starch product is recovered by filtration and washed free of residual salts with water, and is thereafter dried. Alternatively, the product may be drum dried, or spray dried, or gelatinized and isolated by freeze drying or alcohol precipitation.

In order to have thin-thick properties suitable for use in retorting food products, the modified high amylose starches of this invention must possess certain well-defined viscosity characteristics. Accordingly, the extent of inhibition must be controlled so that dispersions of the resulting modified starch have a Brookfield viscosity within rather narrow limits after first cooking at 180°F and then retorting at 250°F. The viscosity measurements are made as follows. All measurements are made on a cooked starch suspension containing 5.0 per cent, by weight of starch, dry basis, at a temperature of 75°F after the cooked suspension has been allowed to stand for 24 hours at room temperature. The suspension is first cooked at a concentration of 5.0 per cent, by weight starch solids concentration, dry basis, in a pH 6.5 buffered salt solution for 25 minutes at 180°F. The solution is made up to the standard 5.0 per cent solids concentration, if necessary, by adding more of the buffered salt solution, is then allowed to stand for 24 hours at room temperature, and the viscosity is measured at 75°F. The viscosity after this first cooking should be between 0 and 1,500 centipoises. An identical starch suspension is then cooked at the same 5.0 per cent starch solids concentration in the pH 6.5 buffered salt solution for 10 minutes at a temperature of 212°F and then for 15 minutes at a temperature of 250°F. The concentration of starch solids is again adjusted to 5.0 per cent solids, if necessary, the cooked suspension is then allowed to stand again for 24 hours at room temperature and the Brookfield viscosity is again measured at 75°F. The Brookfield viscosity after the second cooking (retorting) should be between 1,500 and 10,000 centipoises and at least four times that after the first cooking. The starch suspension is stirred periodically during the 180°F and 212°F cooking steps. As is well known to one skilled in the art, the viscosity of heavy starch dispersions will decrease if the spindle of the Brookfield viscometer is permitted to turn for a long time before recording the viscosity. The viscosity values described herein were obtained by allowing the spindle to turn three complete revolutions before reading and recording the viscosity.

Hydroxypropylated, high amylose starches which are not inhibited will have undesirable texture after retorting. The products will be cohesive or stringy. Inhibiting with small amounts of cross-linking reagent, for example about 0.005% epichlorohydrin, will give the starch thickeners of this invention a desired smooth and short texture. If too much cross-linking reagent is used, for example more than about 0.016% epichlorohydrin, the starch thickeners will be too thin after retorting and thus will not be useful. It is not the amount of cross-linking reagent which is added to the reaction vessel that determines the properties of the final product, but the amount of cross-linking reagent which is reacted with the hydroxypropylated, high amylose starch. The amount of cross-linking reagent necessary to give the starch products of this invention desirable texture and viscosity properties will vary depending on the starch base used, the % amylose in the starch base, the cross-linking reagent used, the reaction efficiency of the cross-linking reagent, the level of hydroxypropyl ether substitution on the starch base, and the necessity for having a final product which falls within a specified range of inhibition as determined by its viscosity characteristics. A further discussion of inhibition of starches may be found in C. H. Hullinger, "Production and Use of Cross-Linked Starch," in R. L. Whistler and E. F. Paschall, Eds., Starch: Chemistry and Technology, Academic Press, New York, 1967, Vol II, pp. 445–450.

The inhibited starch products of this invention are particularly useful in the food industry where they may be employed as thickeners for pie fillings, sauces, soups, baby foods etc. They are of particular interest in the canning industry as a result of their unique behavior during retorting of the canned food products.

In this application, the starch thickeners should not develop significant viscosity when cooked with foods at atmospheric pressure, but should develop significant viscosity after retort cooking conditions (240°–300°F). When this type of starch thickener is used, the food product can be heated to retort temperatures much faster than normal because the initial low viscosity will result in much better heat transfer into the can and its contents. The reduced cooking time will lower operating costs and also improve the quality of the product. After the contents of the can are sterilized, the starch should thicken to give the final food product the desired viscosity and texture. The starch thickeners of this invention are very useful for this type of retort process. The starch products are initially in a thin state, thereby enabling the heat utilized for sterilization of the food product to rapidly penetrate the can and its contents. After the contents of the can are sterilized and the can is being cooled, the starch products remain thin until the temperature decreases below about 120°F. This enables the contents of the can to be rapidly cooled after retorting and will result in an additional savings in operating costs and also an improvement in the quality of the product. After cooling to 75°C and standing at room temperature overnight, the starch products thicken and have desirable viscosity and texture.

The usual pH level of canned foods is about 2.0 to 8.0. Food sytems at pH 4.5 or less are not normally retorted because clostridium botulinum does not grow at these low pH's and heating above 180°F is sufficient for sterilization. However, these low pH food systems are sometimes heated to retort temperatures, e.g., 270°F where the starch thickeners of this invention would be advantageous. For example, many spaghetti sauces have low pH's and would not normally be retorted, but a spaghetti sauce and meatball mixture must be retorted to sterilize the meatballs.

The invention will be further illustrated by the following examples which are not, however, intended to limit its scope.

EXAMPLE I

This example illustrates the preparation of the uniquely modified, hydroxypropylated high amylose starch products of this invention.

A total of 1000 parts high amylose corn starch containing 55%, by weight, amylose was introduced into a reaction vessel containing a solution of 15 parts sodium hydroxide and 150 parts sodium sulfate in 1500 parts water. The 100 parts of propylene oxide was added and the vessel was sealed. The contents were allowed to react for 16 hours at 40°C while the vessel was continuously tumbled to assure uniform suspension of the starch throughout the mixture. Then 6.0 parts of an aqueous epichlorohydrin solution (1.0% by weight) was added to the vessel. The epichlorohydrin was allowed to react with the starch for 5 hours at 40°C, while the vessel was again continuously tumbled. The pH of the resultant suspension was adjusted to 6.0 by the addition of 9.5% by hydrochloric acid solution and the epichlorohydrin-inhibited starch was recovered by filtration, washed three times with water, and dried.

The propylene oxide content was determined by the Zeisel procedure. The above described starch derivative (Sample A) was found to contain 7.0% propylene oxide, dry basis (M. S. of 0.21).

EXAMPLE II

This example illustrates the necessity of employing a hydroxypropyl high amylose starch having a M. S. within the prescribed range as well as the proper amount of inhibition in order to obtain thin-thick properties.

A series of inhibited, granular high amylose corn starches containing 55%, by weight, amylose were prepared in a manner similar to that employed in Example I, except that the amounts of propylene oxide and epichlorohydrin were varied. The propylene oxide content and level of inhibition data are summarized in Table I.

The thin-thick properties of the above described inhibited, hydroxypropylated starches were determined in the following manner. A total of 7.5 grams, dry basis, starch was suspended in 130.0 grams pH 6.5 buffer solution and 1.5 grams sodium chloride was then dissolved in the solution. The total weight of the suspension was brought to 150.0 grams by adding additional pH 6.5 buffer solution. The resulting suspensions were cooked for 25 minutes at 180°F in a water bath or 10 minutes at 212°F in a water bath followed by 15 minutes at 15 p.s.i.g. and 250°F in an autoclave. The samples were brought back to 5.0% starch solids with pH 6.5 buffer and the Brookfield viscosities of the 5% pastes were measured as the pastes cooled to 180°F, 120°F, 75°F and after standing overnight at room temperature (viscosity measured at 75°F). The pH 6.5 buffer was prepared by dissolving 10,000 grams anhydrous disodium phosphate and 2,000 grams sodium benzoate in approximately 975 ml distilled water. The pH of the resulting solution was adjusted to 6.5 by adding citric acid (approximately 3.5 g. required) and then the total weight was brought to 1,000 g. by adding distilled water.

Viscosities were measured with a Brookfield RVF viscometer, and the viscosity data are summarized in Table II.

A second series of inhibited, hydroxypropylated starches were prepared and evaluated as described above except that the starch was a high amylose corn starch containing 70%, by weight, amylose instead of a high amylose starch containing 55%, by weight, amylose. The results are listed in Table I and Table II. Data for starches prepared from corn starch are also listed for comparison purposes.

The data show that all starches prepared from high amylose corn starch (Sample A to K) developed no significant viscosity when cooked at 180°F in the pH 6.5 buffer salt solution. Similarly derivatized corn starches (Samples L to M) developed relatively high viscosities when cooked under the same conditions at 180°F and cooled. When retorted at 250°F and cooled, the high amylose corn starch derivatives remained relatively thin until the temperature reached 75°F while the corn starch products showed significant viscosity at 180°F. If corn starch derivatives (Sample N) are prepared with high levels of inhibition and which have no significant viscosity after being cooked at 180°F in the pH 6.5 buffer salt solution, they will also have no significant viscosity when retorted at 250°F and cooled. All samples prepared from ordinary corn starch (L, M, N) show the further defect that the ratio of viscosity after autoclaving and standing overnight to viscosity after cooking at 180°F and standing overnight is undesirably low (less than 4).

Table I

| Sample | % Propylene Oxide Content, Dry Basis | M.S. | % Epichlorohydrin Based on Starch | Base Starch* |
|---|---|---|---|---|
| A | 7.0 | 0.21 | 0.006 | I |
| B | 7.0 | 0.21 | 0.010 | I |
| C | 7.0 | 0.21 | 0.016 | I |
| D | 5.7 | 0.17 | 0.008 | I |
| E | 5.7 | 0.17 | 0.012 | I |
| F | 3.6 | 0.10 | 0.010 | I |
| G | 7.1 | 0.21 | 0.003 | II |
| H | 7.1 | 0.21 | 0.006 | II |
| J | 7.1 | 0.21 | 0.010 | II |
| K | 7.1 | 0.21 | 0.013 | II |
| L | 4.9 | 0.14 | 0.020 | Corn |
| M | 4.3 | 0.13 | 0.015 | Corn |
| N | 7.2 | 0.22 | 0.030 | Corn |

*I is high amylose corn starch, 55% amylose by weight
II is high amylose corn starch, 70% amylose by weight Table II

| Sample | Brookfield Viscosity* after 180°F cooking (cps) | | | | Brookfield Viscosity* after 250°F autoclaving (cps) | | | |
|---|---|---|---|---|---|---|---|---|
| | 180°F | 120°F | 75°F | Overnight | 180°F | 120°F | 75°F | Overnight |
| A | 0 | 8 | 24 | 24 | 52 | 300 | 2660 | 4070 |
| B | 0 | 0 | 20 | 20 | 40 | 180 | 1740 | 4200 |

Table II — Continued

| Sample | Brookfield Viscosity* after 180°F cooking (cps) | | | | Brookfield Viscosity* after 250°F autoclaving (cps) | | | |
|---|---|---|---|---|---|---|---|---|
| | 180°F | 120°F | 75°F | Overnight | 180°F | 120°F | 75°F | Overnight |
| C | 0 | 0 | 0 | 0 | 20 | 132 | 2600 | 2420 |
| D | 0 | 0 | 0 | 0 | 44 | 384 | 3560 | 3560 |
| E | 0 | 0 | 0 | 0 | 28 | 200 | 800 | 2500 |
| F | 0 | 0 | 0 | 0 | 44 | 372 | 720 | 1700 |
| G | 0 | 0 | 0 | 0 | 12 | 80 | 3800 | 6600 |
| H | 0 | 0 | 0 | 0 | 0 | 40 | 2300 | 4800 |
| J | 0 | 0 | 0 | 0 | 4 | 40 | 1500 | 3220 |
| K | 0 | 0 | 0 | 0 | 0 | 40 | 2000 | 2900 |
| L | 290 | 360 | 600 | 1590 | 700 | 2070 | 2430 | 3555 |
| M | 240 | 300 | 420 | 1270 | 670 | 1910 | 2170 | 3130 |
| N | 16 | 20 | 28 | 60 | 16 | 40 | 140 | 174 |

*Viscosities of sample L and M were measured with spindle No. 4 at speed 20 rpm. Viscosities of samples A-K, and N were measured when between 0–1500 with spindle No. 2 at speed 10 rpm, and when between 1500–6600 with spindle No. 4 at speed 10 rpm.

EXAMPLE III

This example illustrates the preparation of inhibited, hydroxypropylated high amylose starches of this invention where phosphorus oxychloride is used as the inhibiting reagent.

A total of 1,000 parts high amylose corn starch containing 55%, by weight, amylose was added to a reaction vessel containing a solution of 15 parts sodium hydroxide and 150 parts sodium sulfate in 1,500 parts water. After the addition of 100 parts propylene oxide, the reaction vessel was sealed. The contents were allowed to react for 16 hours at 40°C while the vessel was continuously tumbled to assure uniform suspension of the starch throughout the mixture. Then 0.10 parts phosphorus oxychloride was added to the vessel. The phosphorus oxychloride was allowed to react with the starch for two hours at 40°C, while the suspension was continuously stirred. The pH of the resultant suspension was lowered to 6.0 by the addition of 9.5% hydrochloric acid solution and the phosphorus oxychloride inhibited starch was recovered by filtration, washed three times with water, and dried. The product was found to contain 7.5% propylene oxide, dry basis (M. S. of 0.23).

The derivative was analyzed for thin-thick properties using the pH 6.5 buffered salt procedure described in Example II. The results are listed in Table III.

Two more puddings were prepared. The first (pudding Y) had the same composition as pudding X except starch A of example II was replaced with starch B of example II. The second (pudding Z) had the same composition as pudding X, except starch A was replaced with starch L of example II.

Each pudding was evaluated in a high pressure Brabender apparatus. This apparatus consists of a Brabender amylograph which is completely enclosed in a metal chamber. The chamber is sealed and the Brabender viscosity of the pudding composition can be measured at retort temperatures and pressures. The pudding was added to the Brabender amylograph at room temperature (about 25°C) and then rapidly heated to 132°C. It required about 17.5 minutes for the temperature to reach 132°C and the pudding was then rapidly cooled. The viscosity was measured, using a 350 cm. g. sensitivity cartridge and the results are shown in FIG. I.

FIG. I shows that puddings prepared with the high amylose corn starch derivatives of this invention (pudding X and pudding Y) have a very low viscosity during retorting, but develop a relatively high viscosity upon cooling after retorting. A product prepared from regular corn starch (pudding Z) also has a low viscosity during retort, but the viscosity upon cooling remains relatively low and thus undesirable for a thickening agent.

Table III

| Brookfield Viscosity* after 180°F cooking (cps) | | | | Brookfield Viscosity after 250°F autoclaving (cps) | | | |
|---|---|---|---|---|---|---|---|
| 180°F | 120°F | 75°F | Overnight | 180°F | 120°F | 75°F | Overnight |
| 0 | 0 | 4 | 16 | 20 | 176 | 1280 | 4340 |

*Viscosities between 0–1500 measured with spindle No. 2 at speed 10 rpm, and viscosities between 1500–6600 measured with spindle No. 4 at speed 10 rpm.

EXAMPLE IV

This example illustrates the use of the inhibited, hydroxypropylated high amylose starches of this invention in a typical pudding formulation.

The composition of the pudding (pudding X) comprised the following:

| Ingredient | Concentration in parts |
|---|---|
| sugar | 12.85 |
| starch A of example II | 3.5 |
| water | 78.75 |
| carrageenan (high milk reactivity) | 0.1 |
| sodium 2-stearyl lactylate | 0.2 |
| non-fat dry milk | 0.75 |
| coconut oil | 3.75 |
| emulsifier (fatty acid monoglyceride) | 0.10 |

EXAMPLE V

This example illustrates the use of the inhibited, hydroxypropylated high amylose starches of this invention in a typical condensed cream of mushroom formulation.

A Cenco-Bostwick consistometer was used to measure viscosity. Bostwick viscosity is measured in terms of the distance a sample flows on an inclined plane in 60 seconds. The greater the distance traveled, the lower the viscosity.

The composition of the condensed cream of mushroom soup comprised the following:

| Ingredient | Concentration in parts |
|---|---|
| A milk | 35.000 |
| water | 20.691 |
| heavy cream | 8.000 |
| sugar | 0.940 |
| B. starch B (Table II), anhydrous | 5.500 |
| water (total of water adsorbed by starch and free water) | 15.000 |
| C. mushrooms | 10.000 |
| vegetable oil | 3.000 |
| salt (sodium chloride) | 1.800 |
| monosodium glutamate | 0.030 |
| white pepper | 0.030 |
| curry powder | 0.009 |
| | 100.000 |

Part B was cooked with stirring in a boiling water bath for 10 minutes. Part A which was previously thoroughly mixed was blended into Part B and the mixture heated to about 190°F. Part C was then added and the mixture had an initial Bostwick viscosity (distance flowed in 60 seconds), measured at 180°F, of 20 cm. The hot mixture was then placed in an autoclave and heated to 258°F at 19 p.s.i.g. It required about 20 minutes for the autoclave temperature to reach 258°F and the soup was retorted at 258°F for an additional 30 minutes. The Bostwick viscosity immediately after retort (measured at 180°F) was 15. After being stored at room temperature for 24 hours, the Bostwick viscosity (measured at 75°F) was 8.6.

This data shows that the starch thickeners of this invention remain thin when cooked at 190°–212°F, remain relatively thin during retorting, but develop significant viscosity after retorting.

EXAMPLE VI

This example illustrates the use of various starch-inhibiting reagents to prepare the inhibited, hydroxypropylated high amylose starches of this invention.

High amylose corn starch containing 55%, by weight, amylose was treated with 10.0% propylene oxide as described in Example I. The resulting starch (Starch Q) contained 7.7% propylene oxide (M. S. = 0.23).

Starch R — A total of 250 parts starch Q was suspended in 375 parts water containing 37.5 parts sodium sulfate and 3.75 parts sodium hydroxide. Then 0.05 parts sodium trimetaphosphate was added and the mixture reacted at 40°C for 4 hours, while being continuously tumbled to assure uniform suspension of the starch throughout the mixture. At the end of the reaction, the pH was lowered to 5.5 with 9.5% hydrochloric acid, the starch recovered by filtration, washed three times with water, and dried.

Starch S — A total of 250 parts starch Q was suspended in 375 parts water containing 37.5 parts sodium sulfate. Then 2.5 parts of mixed adipic-acetic anhydride (formed by mixing 9 parts acetic anhydride and 1 part adipic acid, slowly heating to 90°C over 1 hour, holding at 90°C for an additional hour, and cooling) was added slowly over a 1 hour period while continuously controlling the pH at 8.0 with 3% aqueous sodium hydroxide. A total of 39 parts 3% sodium hydroxide was required to control the pH at 8.0. After addition of adipic-acetic anhydride was complete, the reaction was over in about 5 minutes when there was no further change in pH. The starch was stirred for an additional 1 hour, the pH lowered to 5.0 with 9.5% hydrochloric acid, the starch recovered by filtration, washed three times with water, and dried.

Starch T — A total of 200 parts of starch Q was suspended in 250 parts water containing 60 parts sodium sulfate and 3 parts sodium hydroxide. Then 0.02 parts 1,4-dichloro-2-butene was added and the mixture reacted at 40°C for 4 hours while being continuously tumbled to assure uniform suspension of the starch throughout the mixture. At the end of the reaction, the pH was lowered to 5.5 with 9.5% hydrochloric acid, the starch recovered by filtration, washed three times with water, and dried.

Starch U — A total of 200 parts starch Q was suspended in 250 parts water containing 60 parts sodium sulfate and 3.0 parts sodium hydroxide. Then 0.04 parts acrolein was added and the mixture reacted at 40°C for 4 hours while being continuously tumbled to assure uniform suspension of the starch throughout the mixture. At the end of the reaction, the pH was lowered to 5.5 with 9.5% hydrochloric acid, the starch recovered by filtration, washed three times with water, and dried.

The starches described above were evaluated by the procedure described in Example II and the retort data are summarized in Table IV. Viscosities were measured with a Brookfield RVF viscometer.

Table IV

| Sample | Brookfield Viscosity after 180°F cooking (cps)[1] | | | | Brookfield Viscosity after 250°F autoclaving (cps) | | | |
|---|---|---|---|---|---|---|---|---|
| | 180°F | 120°F | 75°F | Overnight | 180°F[2] | 120°F[2] | 75°F[3] | Overnight[3] |
| R | 6 | 11 | 25 | 23 | 16 | 120 | 3100 | 6260 |
| S | 5 | 10 | 16 | 21 | 52 | 208 | 5000 | 7940 |
| T | 8 | 14 | 21 | 10 | 64 | 160 | 3100 | 5260 |
| U | 6 | 10 | 13 | 5 | 40 | 232 | 6000 | 7400 |

[1] Viscosities measured with No. 1 spindle at 10 rpm (quantities doubled for measurement with No. 1 spindle).
[2] Viscosities measured with No. 2 spindle at 10 rpm.
[3] Viscosities measured with No. 4 spindle at 10 rpm.

EXAMPLE VII

This example illustrates the preparation of a chicken gravy containing a typical inhibited high amylose starch of the present invention and the viscosity characteristics thereof.

A total of 60.6 parts of chicken broth (fat removed), 3.2 parts of chicken fat, 30.2 parts of water, and 12.0 parts of hydroxypropylated inhibited high amylose starch, as described fully below, were combined and cooked at 190°F for a period of 30 minutes. Water lost by evaporation was replaced in order to keep a constant weight. The gravy mixture was then poured into conventional No. 2 cans, and sealed in the usual manner. The filled cans were retorted at 258°F for 30 minutes and the Bostwick viscosity immediately after retort (measured at 180°F), was 23.0 cm. in 60 seconds. The retorted chicken gravy was allowed to stand at room temperature for 24 hours and the Bostwick viscosity (measured at 75°F) was then 3.8 cm. in 60 seconds.

Table VI

| Brookfield Viscosity* after 180°F cooking (cps) | | | | Brookfield Viscosity* after 250°F autoclaving | | | |
|---|---|---|---|---|---|---|---|
| 180°F | 120°F | 75°F | Overnight | 180°F | 120°F | 75°F | Overnight |
| 50 | 150 | 745 | 1240 | 52 | 220 | 3200 | 9000 |

*Viscosity between 0–750 measured with No. 1 spindle at speed 10 rpm. All weights described in procedure of Example II were doubled. Viscosity between 1000–1500 measured with spindle No. 2 at speed 20 rpm and viscosity between 1500–9000 measured with spindle No. 4 at speed 10 rpm.

This data shows that the starch thickeners of this invention when added to a chicken gravy remains thin at temperatures above 180°F, but develop significant viscosity after retorting and cooling to room temperature.

The starch used in the above chicken gravy was prepared by reacting high amylose corn starch containing 55%, by weight, amylose with 10.0% propylene oxide followed by 0.009% epichlorohydrin as described in Example I. Zeisel analysis of the resulting product indicated it contained 6.5% propylene oxide, dry basis (M. S. of 0.19). The starch product was analyzed for thin-thick properties using the pH 6.5 buffered salt procedure described in Example II and the results are listed in Table V.

Table V

| Brookfield Viscosity* after 180°F cooking (cps) | | | | Brookfield Viscosity** after 250°F autoclaving (cps) | | | |
|---|---|---|---|---|---|---|---|
| 180°F | 120°F | 75°F | Overnight | 180°F | 120°F | 75°F | Overnight |
| 6 | 11 | 7 | 20 | 24 | 92 | 1200 | 5000 |

*Viscosity measured with spindle No. 1 at speed 10 rpm. All weights as described in procedure of Example II were doubled.
**Viscosity between 0–1500 measured with spindle No. 2 at speed 10 rpm, and viscosity between 1500–6600 measured with spindle No. 4 at speed 10 rpm.

EXAMPLE VIII

This example illustrates the preparation of inhibited, hydroxypropylated high amylose starches of this invention which are isolated from aqueous dispersions by freeze drying.

A total of 30 parts of granular hydroxypropylated, inhibited high amylose corn starch containing 55%, by weight, amylose, as described fully below, was suspended in 170 parts water. The aqueous suspension was heated in a boiling water bath for 30 minutes to disperse the starch, an additional 200 parts water added, and the resulting dispersion freeze dried.

The above starch derivative was prepared by reacting high amylose corn starch containing 55%, by weight, amylose with 10.0% propylene oxide and 0.010% epichlorohydrin as described in Example I. Zeisel analyses of the resulting product indicated it contained 7.0% propylene oxide, dry basis (M. S. of 0.21).

The freeze dried starch product was analyzed for thin-thick properties using the pH 6.5 buffered salt procedure described in Example II and the results are listed in Table VI.

In summary, this invention discloses a novel derivatized starch having excellent properties for use in retorted food products prepared by hydroxypropylation and inhibition of high amylose starch.

Variations may be made in procedures, proportions and materials without departing from the scope of this invention.

We claim:

1. A cross-linked, hydroxypropylated high amylose starch product, the starch containing at least 50 per cent amylose, the starch product having a hydroxypropyl M. S. between 0.10 and 0.30 and cross-linked with a cross-linking agent to an extent characterized in that an aqueous dispersion containing 5.0 per cent, by weight, of said starch product has a Brookfield viscosity measured at 75°F between 0 and 1500 centipoises after being cooked at 5.0 per cent, by weight, starch product solids concentration, dry basis, in a pH 6.5 buffered salt solution at 180°F for 25 minutes and standing at room temperature for 24 hours, and a Brookfield viscosity measured at 75°F between 1,500 and 10,000 centipoises after being cooked at 5.0 per cent, by weight, starch product solids concentration, dry basis, in a pH 6.5 buffered salt solution at 212°F for 10 minutes followed by 15 minutes at 250°F and after standing for 24 hours at room temperature, said viscosity after cooking at 250°F being at least four times said viscosity after cooking at 180°F.

2. A starch product according to claim 1 wherein the hydroxypropylated starch is cross-linked by groups derived from epichlorohydrin.

3. A starch product according to claim 1 wherein the hydroxypropylated starch is cross-linked by phosphate ester groups.

* * * * *

UNITED STATES PATENT OFFICE
CERTIFICATE OF CORRECTION

PATENT NO. : 3,904,601
DATED : September 9, 1975
INVENTOR(S) : Martin M. Tessler et al.

It is certified that error appears in the above—identified patent and that said Letters Patent are hereby corrected as shown below:

Column 1, line 17, after "to", insert --food products the required special properties, have come into--.

Column 1, line 22, delete "a" and insert --at--.

Column 5, line 17, delete "by".

Column 6, line 8, delete "10,000" and insert --10.000--.

Column 6, line 9, delete "2,000" and insert --2.000--.

Signed and Sealed this eighteenth Day of May 1976

[SEAL]

Attest:

RUTH C. MASON
Attesting Officer

C. MARSHALL DANN
Commissioner of Patents and Trademarks